(12) United States Patent
Kappes et al.

(10) Patent No.: US 7,595,365 B2
(45) Date of Patent: Sep. 29, 2009

(54) COMBINATIONS OF TACKIFIER AND POLYALPHAOLEFIN OIL

(75) Inventors: Nicolas Kappes, Brussels (BE); Jacques B. Lechat, Braine L'Alleud (BE); Olivier H. V. Lacoste, Rueil-Malmaison (FR); Martine Dictus, Willebroek (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 415 days.

(21) Appl. No.: 11/241,058

(22) Filed: Sep. 30, 2005

(65) Prior Publication Data

US 2006/0079617 A1  Apr. 13, 2006

Related U.S. Application Data

(60) Provisional application No. 60/617,594, filed on Oct. 8, 2004.

(51) Int. Cl.
*C08L 45/00* (2006.01)
(52) U.S. Cl. .................. 525/211; 525/210; 508/591
(58) Field of Classification Search .................. 508/591; 525/210, 211
See application file for complete search history.

(56) References Cited

U.S. PATENT DOCUMENTS

| | | | |
|---|---|---|---|
| 3,382,291 A | 5/1968 | Brennan | |
| 3,742,082 A | 6/1973 | Brennan | |
| 3,769,363 A | 10/1973 | Brennan | |
| 3,876,720 A | 4/1975 | Heilman et al. | |
| 4,149,178 A | 4/1979 | Estes | |
| 4,239,930 A | 12/1980 | Allphin et al. | |
| 4,284,542 A | 8/1981 | Boyce et al. | |
| 4,328,090 A | 5/1982 | Stuckey, Jr. et al. | |
| 4,367,352 A | 1/1983 | Watts, Jr. et al. | |
| 4,413,156 A | 11/1983 | Watts, Jr. et al. | |
| 4,434,408 A | 2/1984 | Baba et al. | |
| 4,500,424 A | 2/1985 | Simpson et al. | |
| 4,629,766 A | 12/1986 | Malatesta et al. | |
| 4,686,030 A | 8/1987 | Ward | |
| 4,846,961 A | 7/1989 | Robinson et al. | |
| 4,849,093 A | 7/1989 | Vauk et al. | |
| 4,910,355 A | 3/1990 | Shubkin et al. | |
| 4,956,122 A | 9/1990 | Watts et al. | |
| 5,068,487 A | 11/1991 | Theriot | |
| 5,151,205 A | 9/1992 | Culpon, Jr. | |
| 5,171,793 A | 12/1992 | Johnson et al. | |
| 5,171,908 A | 12/1992 | Rudnick | |
| 5,502,104 A | 3/1996 | Hohner et al. | |
| 5,783,531 A | 7/1998 | Andrew et al. | |
| 5,820,749 A | 10/1998 | Haluska et al. | |
| 5,869,164 A * | 2/1999 | Nickerson et al. ............. 428/76 |
| 5,877,131 A * | 3/1999 | Barnes ....................... 508/312 |
| 5,936,058 A | 8/1999 | Schauder | |
| 6,221,448 B1 | 4/2001 | Baetzold et al. | |
| 6,776,923 B2 * | 8/2004 | Balian et al. ................... 252/71 |
| 2004/0092408 A1 | 5/2004 | Willey et al. | |
| 2004/0106723 A1 | 6/2004 | Yang et al. | |
| 2004/0242721 A1 * | 12/2004 | Muyldermans et al. ...... 522/109 |
| 2006/0008643 A1 * | 1/2006 | Lin et al. ..................... 428/364 |
| 2006/0189744 A1 * | 8/2006 | Tse et al. ..................... 524/447 |

FOREIGN PATENT DOCUMENTS

| | | |
|---|---|---|
| EP | 0 082 726 | 4/1986 |
| EP | 0451920 | 7/1999 |
| WO | WO93/03093 | 2/1993 |
| WO | WO95/12623 | 5/1995 |
| WO | 96/03470 | 2/1996 |

OTHER PUBLICATIONS

Rudnick, Leslie R. and Shubkin, Ronald L.; Synthetic Lubricants and High Performance Functional Fluids; *Polyolefins*; p. 3-52; Marcel Dekker, Inc., 1999.

* cited by examiner

*Primary Examiner*—Peter Szekely

(57) ABSTRACT

The use of a polyalphaolefin oil or combinations of polyalphaolefin oils to modify the softening point characteristics of a tackifier and compositions containing a tackifier and polyalphaolefin oil are disclosed herein.

2 Claims, No Drawings

COMBINATIONS OF TACKIFIER AND POLYALPHAOLEFIN OIL

RELATED APPLICATIONS

This application is related to and claims priority from U.S. Ser. No. 60/617,594, filed Oct. 8, 2004 incorporated herein by reference.

BACKGROUND

The present invention relates to combinations of polyalphaolefin oils and tackifiers.

Tackifiers may be commonly used in adhesive systems in combination with one or more natural or synthetic elastomers, and/or other ingredients, such as plasticizers, waxes, fillers, and/or antioxidants. Tackifiers are generally either solid or liquid at room temperature and generally have corresponding high or low softening points. The performance of these tackifiers may also vary according to softening point.

High softening point tackifiers increase the softening point of the adhesive formulation and are easily handled. These tackifiers may also have softening points greater than about 80° C. and are solid at or near room temperature (around 20° C.-25° C.). Lower softening point tackifiers are liquid at room temperature, with softening points generally less than about 25° C. Because they are liquid they may be more difficult to handle, but they may also provide the benefits of decreasing the softening point and the glass transition temperature ($T_g$) of the adhesive.

Medium softening point (MSP) tackifiers may generally be semi-solid materials at room temperature. Although they appear solid, they will flow over time. Such resins have softening points ranging from about 25-80° C., more likely 35-65° C., and more likely within the range of 50-60° C.

Adhesive formulations incorporating MSP tackifiers have lower volatilities than those formulated with a liquid resin and/or plasticizing oil, and can be applied over a broader range of temperatures than similar systems formulated with normally liquid and/or normally solid resins and/or processing oils. In addition, aging studies indicate that the adhesives incorporating MSP tackifiers bleed less and stain less than adhesive formulated with conventional tackifiers and conventional plasticizers.

Control of the softening point is important in the production of tackifiers. The softening point of the tackifying resin is generally determined by the stripping conditions. Targeting a specific softening point while maintaining the resin properties may be difficult. It would be beneficial to find an alternate and less difficult method to target and control the softening point of the tackifier, without losing any of the tackifier properties.

Alternatively, other routes to manufacture MSP resins have been considered and disclosed herein are combinations of one or more conventional tackifiers and one or more polyalphaolefin oils (PAO(s)). The use of certain PAOs lowers the softening point characteristics of the tackifier, which can be controlled by varying the amount or type of PAO selected. This allows tackifier manufacturers and adhesive formulators to target a specific softening point without the difficulties normally encountered during manufacturing or the drawbacks associated with using conventional plasticizers or processing oils.

SUMMARY

The embodiments disclosed herein include a composition comprising at least one tackifier and a polyalphaolefin oil (PAO) or combination of one or more PAOs, wherein the PAO or combination of PAOs has (i) a Kinematic viscosity ≦ about 10.5 mm²/s at 100° C. and/or (ii) a pour point ≦ about −38° C. A process is also disclosed which comprises mixing at least one tackifier and at least one PAO having one or more of the properties described herein. Also disclosed is the use of one or more PAOs to lower the softening point characteristics of a tackifier or combination of tackifiers.

DETAILED DESCRIPTION

The compositions disclosed herein generally comprise a tackifier and a polyalphaolefin oil (PAO). In certain embodiments the compositions may consist or consist essentially of at least one tackifier and at least one PAO. Additional embodiments disclosed herein include adhesives comprising the aforementioned combinations, masterbatches useful in producing adhesives, and processes for making suitable mixtures, masterbatches and adhesives containing the tackifier and PAO.

The compositions described herein preferably comprise from about 99.99 to 20 wt % tackifier(s) and about 80 to 0.01 wt % PAO(s) based on the weight of the tackifier(s) and PAO(s). When referring to compositional amounts of the tackifier and PAO, the amounts refer to the total amount of tackifier(s) and PAO(s) if the composition comprises more than one of either component. The final compositional amounts will depend on the desired softening point or other characteristic(s) desired by the end user.

The term "about" as used herein with respect to numerical ranges applies to both the upper and lower end of the range.

The amount of PAO(s) (based on the weight of tackifier and PAO) preferably ranges from about 0.01-80% wt, more preferably about 1-75 wt %, more preferably about 2-50 wt %, more preferably about 2-40 wt %, more preferably about 3-30 wt %, more preferably about 4-30 wt %, more preferably about 4-25 wt %, more preferably about 5-20 wt %. Other suitable ranges include from about 5-15 wt %, about 10-15 wt %, about 5-12 wt %, about 12-20 wt %, and about 12-25 wt %.

Corresponding amounts of tackifier (based on the weight of tackifier and PAO) preferably range from about 20-99.99 wt %, more preferably about 25-99 wt %, more preferably about 50-98 wt %, more preferably about 60-98 wt %, more preferably about 70-97 wt %, more preferably about 70-96 wt %, more preferably about 75-96 wt %, more preferably about 80-95 wt %. Other corresponding ranges of tackifier include about 85-95 wt %, about 85-90 wt %, about 88-95 wt %, about 80-88 wt %, and about 75-88 wt %.

The invention relates to a composition comprising from 75-95 wt % tackifier and from 5-25 wt % PAO based on the weight of the tackifier and PAO(s).

Exemplary tackifiers include aliphatic hydrocarbon resins, hydrogenated aliphatic hydrocarbon resins, aromatic modified aliphatic hydrocarbon resins, hydrogenated aromatic modified aliphatic hydrocarbon resins, polycyclopentadiene resins, hydrogenated polycyclopentadiene resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, maleic acid/anhydride modified tackifier, terpene modified aromatic and/or aliphatic hydrocarbon resin, hydrogenated terpene modified aromatic and/or aliphatic hydrocarbon resin, polyterpene resins, hydrogenated polyterpene resins, aromatic modified polyterpene resins, hydrogenated aromatic modified polyterpene resins, terpene-phenol resins, hydrogenated terpene-phenol resins, gum rosin resins, hydrogenated gum rosin resin, gum rosin ester resins, hydrogenated gum rosin ester resins, wood rosin resin, hydrogenated wood rosin resins, wood rosin ester resins, hydrogenated wood rosin ester resins, tall oil rosin resins, hydrogenated tall oil rosin resins, tall oil rosin ester resins, hydrogenated tall oil rosin ester resins, rosin acid resins, hydrogenated rosin acid resins, and mixtures of two or more thereof. These materials are preferably low molecular weight materials having a weight-average molecular weight (Mw) below 10,000, more preferably below 5,000, more preferably below 2500, more preferably below 2000, with suitable ranges falling in between 1 and 1000, more preferably 500-2000, and more preferably 500-1000.

Suitable commercially available tackifiers include ESCOREZ® 1000, 2000 and 5000 series hydrocarbon resins, ECR-373, Oppera™ PR 100, 101, 102, 103, 104, 105, 106, 111, 112, 115, and 120, available from ExxonMobil Chemical Company, ARKON™ M series, Arkon P series and SUPER ESTER™ rosin esters available from Arakawa Chemical Company of Japan, SYLVARES™ phenol modified styrene-α methyl styrene resins, styrenated terpene resins, ZONATAC terpene-aromatic resins, and terpene phenolic resins available from Arizona Chemical Company of Jacksonville, Fla., SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTAC™ $C_5/C_9$ resins, REGALITE™ and REGALREZ™ aromatic and REGALITE™ cycloaliphatic/aromatic resins available from Eastman Chemical Company of Kingsport, Tenn., WINGTACK™ resins available from Goodyear Chemical Company of Akron, Ohio, FORAL™, PENTALYN™, AND PERMALYN™ rosins and rosin esters available from Eastman Chemical Company, QUINTONE™ acid modified $C_5$ resins, $C_5/C_9$ resins, and acid modified $C_5/C_9$ resins available from Nippon Zeon of Japan, and LX™ mixed aromatic/cycloaliphatic resins available from Neville Chemical Company of Pittsburgh, Pa., CLEARON hydrogenated terpene aromatic resins available from Yasuhara Chemical of Japan. The preceding examples are illustrative only and by no means limiting.

These tackifiers before combination with the PAO generally have a Ring and Ball softening point (measured according to ASTM E-28) of about 10-200° C., more preferably about 10-160° C., more preferably about 25-140° C., more preferably about 60-130° C., more preferably about 70-130° C., more preferably about 80-120° C., more preferably about 85-115° C., and more preferably about 90-110° C., wherein any upper limit and any lower limit of softening point may be combined for a preferred softening point range. As used herein, softening point (° C.) is the Ring & Ball softening point, unless otherwise indicated as Mettler softening point, which is measured according to ASTM D 6090-99.

Tackifiers are well known and are produced, for example, by Friedel-Crafts polymerisation of various feeds, which may be pure monomer feeds or refinery streams containing mixtures of various unsaturated materials. Generally speaking, the purer the feed the easier to polymerise. For example pure styrene, pure α-methyl styrene and mixtures thereof are easier to polymerise than a $C_8/C_9$ refinery stream. Similarly, pure or concentrated piperylene is easier to polymerise than $C_4$-$C_6$ refinery streams. These pure monomers are, however, more expensive to produce than the refinery streams which may be by-products of large volume refinery processes.

Aliphatic hydrocarbon resins can be prepared by cationic polymerisation of a cracked petroleum feed containing $C_4$, $C_5$, and $C_6$ paraffins, olefins, and conjugated diolefins referred to herein as $C_5$ monomers. As used herein, $C_5$ monomers preferably excludes DCPD monomers removed by thermal soaking as described below. These $C_5$ monomer streams comprise cationically and thermally polymerisable monomers such as butadiene, isobutylene, 1,3-pentadiene (piperylene) along with 1,4-pentadiene, cyclopentene, 1-pentene, 2-pentene, 2-methyl-1-pentene, 2-methyl-2-butene, 2-methyl-2-pentene, isoprene, cylcohexene, 1-3-hexadiene, 1-4-hexadiene, cyclopentadiene, and dicyclopentadiene. To obtain these feeds the refinery streams are preferably purified usually by both fractionation and treatment to remove impurities. In some embodiments, the $C_5$ feed stream may include at least some (preferably less than 2 wt %) cyclopentadiene (CPD) and substituted cyclopentadiene (e.g., methylcyclopentadiene) components. These components are optionally separated from the $C_5$ monomer streams by thermal soaking wherein the feed stream is heated to a temperature between 100° C. and 160° C., preferably between 100° C. and 150° C., for 0.5 to 6 hours, followed by separation of the DCPD monomers to reduce the level of cyclopentadiene and/or dicyclopentadiene in the $C_5$ monomer stream to preferably below 2 wt %. Low temperature heat soaking is preferred in order to limit the cyclic diene (cyclopentadiene and methylcyclopentadiene) co-dimerisation with $C_5$ linear conjugated dienes (isoprene and pentadienes 1,3 cis- and trans-). The thermal soaking step preferably dimerizes the cyclopentadiene and substituted cyclopentadiene, making separation from the $C_5$ monomer stream easier. After fractionation and, if carried out, thermal soaking, the feedstock is preferably subjected to distillation to remove cyclic conjugated diolefins which are gel precursors (cyclopentadiene and methylcyclopentadiene being removed as dimers, trimers, etc.).

One example of a $C_5$ monomer stream is a steam cracked petroleum stream boiling in the range of −10° C. to 100° C. Examples of commercial samples of $C_5$ monomer feedstocks include Naphtha Petroleum 3 Piperylenes from Lyondell Petrochemical Company of Houston, Tex., regular Piperylene Concentrate or Super Piperylene Concentrate both from Shell Nederland Chemie B.V. of Hoogvilet, the Netherlands.

The resin polymerization feed may also comprise $C_8$-$C_{10}$ aromatic monomers (referred to herein as $C_9$ monomers) such as styrene, indene, derivatives of styrene, derivatives of indene, and combinations thereof. Particularly preferred aromatic olefins include styrene, α-methylstyrene, β-methylstyrene, indene, methylindenes and vinyl toluenes. One example of a $C_9$ monomer stream is a steam cracked petroleum stream, boiling in the range of −10° C. to 210° C. (135° C. to 210° C. if the $C_5$ monomers and DCPD components are not present). Examples of commercial $C_9$ monomer feedstocks include LRO-90 from Lyondell Petrochemical Company, Houston, Tex., DSM $C_9$ Resinfeed Classic from DSM, Geleen, the Netherlands, RO-60 and RO-80 from Dow Chemical Company of Midland, Mich., and Dow Resin Oil 60-L from the Dow Chemical Company of Temeuzen, the Netherlands.

In addition to the reactive components, non-polymerisable components in the feed may include saturated hydrocarbons such as pentane, cyclopentane, or 2-methyl pentane that can be co-distilled with the unsaturated components. This monomer feed can be co-polymerised with other $C_4$ or $C_5$ olefins or dimers. Preferably, however, the feeds are purified to remove unsaturated materials that adversely affect the polymerisation reaction or cause undesirable colors in the final resin (e.g., isoprene). This is generally accomplished by fractionation. In one embodiment, polymerization is conducted using Friedel- Crafts polymerisation catalysts such as supported or unsupported Lewis acids (e.g., boron trifluoride ($BF_3$), complexes of boron trifluoride, aluminium trichloride ($AlCl_3$), complexes of aluminium trichloride or alkyl aluminium halides, particularly chlorides). Suitable reaction conditions for Friedel-Crafts polymerization include temperatures of −20° C. to 100° C., pressures of 100-2000 kPa. In one embodiment, $C_5$ and $C_9$ monomers are polymerized by such a process.

Typically, the feed stream includes between 20-80 wt % monomers and 20-80 wt % solvent. Preferably, the feed stream includes 30-70 wt % monomers and 30-70 wt % of solvent. More preferably, the feed stream includes 50-70 wt % monomers and 30-50 wt % of solvent. The solvent may include an aromatic solvent, which may be toluenes, xylenes, other aromatic solvents, aliphatic solvents and/or mixtures of two or more thereof The solvent is preferably recycled. The solvent may comprise the unpolymerisable component of the feed. The solvents generally contain less than 250 ppm water, preferably less than 100 ppm water, and most preferably less than 50 ppm water.

In another embodiment, the feed stream includes 30-95 wt % of $C_5$ monomers, as described above and 5-70 wt % of a co-feed including at least one member selected from the group consisting of pure monomer, $C_9$ monomers and terpenes. Preferably, the feed stream includes about 50-85 wt % of $C_5$ monomers and about 15-50 wt % of a co-feed, including at least one member selected from the group consisting of pure monomer, $C_9$ monomers, and terpenes.

The monomer feed can be co-polymerised with $C_4$ or $C_5$ olefins or their olefinic dimers as chain transfer agents. Up to 40 wt %, preferably up to 20 wt %, of chain transfer agents may be added to obtain resins with lower and narrower molecular weight distributions than can be prepared from using the monomer feed alone. Chain transfer agents stop the propagation of a growing polymer chain by terminating the chain in a way, which regenerates a polymer initiation site. Components, which behave as chain transfer agents in these reactions include but are not limited to, 2-methyl-1-butene, 2-methyl-2-butene or dimers or oligomers of these species. The chain transfer agent can be added to the reaction in pure form or diluted in a solvent.

Another type of tackifier resin are DCPD resins which may be obtained by or derived from thermal polymerisation of a feed comprising unsaturated monomers of DCPD and/or substituted DCPD. In one embodiment, the feed also comprises aromatic monomers as previously described. In such embodiments, a mixture of (a) DCPD stream, preferably a steam cracked petroleum distillate boiling in the range 80-200° C., more preferably 140° C. to 200° C., containing dimers and codimers of cyclopentadiene and its methyl derivatives together with (b) $C_9$ monomers, preferably a steam cracked distillate boiling in the range 150-200° C. comprising α-methyl styrene, vinyl toluenes, indene and methyl indene with other $C_9$ and $C_{10}$ aromatics.

In one embodiment, the resin is preferably obtained by or derived from thermal polymerisation of a feed comprising $C_5$ monomers and $C_9$ monomers as previously described. In such embodiments, a mixture of (a) $C_5$ monomers, preferably, a steam cracked petroleum distillate boiling in the range 80-200° C. containing $C_5$ monomers together with (b) $C_9$ monomers, preferably a steam cracked distillate boiling in the range 150-200° C. comprising α-methyl styrene, vinyl toluenes, indene and methyl indene with other $C_8$-$C_{10}$ aromatics, in the weight ratio (a:b) between 90:10 to 50:50 is heated in a batch polymerization reactor to 160-320° C. at a pressure of $9.8 \times 10^5$-$20 \times 10^5$ Pa, more preferably $9.8 \times 10^5$-$11.7 \times 10^5$ Pa for 1.2 to 4 hrs, more preferably 1.5 to 4 hrs.

The resin material can also be hydrogenated to reduce coloration and improve color stability. Any of the known processes for catalytically hydrogenating resin material can be used. In particular the processes disclosed in U.S. Pat. Nos. 5,171,793, 4,629,766, 5,502,104 and 4,328,090 and WO 95/12623 are suitable. Generic hydrogenation treating conditions include reactions in the temperature range of about 100-350° C. and pressures of between five atmospheres (506 kPa) and 300 atm (30390 kPa) (and up to 400 atm) hydrogen, for example, 10-275 atm (1013-27579 kPa). In one embodiment the temperature is in the range including 180-330° C. and the pressure is in the range including 15195-20260 kPa hydrogen. The hydrogen to feed volume ratio to the reactor under standard conditions (25° C., 1 atm (101 kPa) pressure) typically can range from 20:1-200:1; for water-white resins 100:1-200:1 is preferred. The hydrogenated product may be stripped to remove low molecular weight by-products and any solvent.

The hydrogenation of the resin material may be carried out via molten or solution based processes by either a batch wise or, more commonly, a continuous process. Catalysts employed for the hydrogenation of tackifiers are typically supported monometallic and bimetallic catalyst systems based on group 6, 8, 9, 10 or 11 elements. Catalysts such as nickel on a support (for example, nickel on alumina, nickel on charcoal, nickel on silica, nickel on kieselguhr, etc), palladium on a support (for example, palladium on silica, palladium on charcoal, palladium on magnesium oxide, etc) and copper and/or zinc on a support (for example copper chromite on copper and/or manganese oxide, copper and zinc on alumina, etc) are good hydrogenation catalysts. The support material is typically comprised of such porous inorganic refractory oxides as silica, magnesia, silica-magnesia, zirconia, silica-zirconia, titania, silica-titania, alumina, silica-alumina, alumina-silicate, etc, with supports containing γ-alumina being highly preferred. Preferably, the supports are essentially free of crystalline molecular sieve materials. Mixtures of the foregoing oxides are also contemplated, especially when prepared as homogeneously as possible. Useful support materials include those disclosed in the U.S. Pat. Nos. 4,686,030, 4,846,961, 4,500,424, and 4,849,093, which are incorporated by reference. Suitable supports include alumina, silica, carbon, MgO, $TiO_2$, $ZrO_2$, $Fe_2O_3$ or mixtures thereof. Other suitable processes for hydrogenating tackifiers are disclosed in U.S. Pat. Nos. 5,820,749 and 4,629,766 and EP 0082726, which are incorporated by reference.

In some embodiments, the tackifier is preferably hydrogenated so that its initial Yellowness Index (YI) color is less than 20, more preferably less than 15, more preferably less than 10, more preferably less than 5 and more preferably less than 1. When color is measured according to the Gardner color scale, the color is preferably less than 2.6, more preferably less than 1.9, and more preferably less than 1.

Hydrogenated tackifiers preferably contain less than 50% aromatic protons, more preferably less than 40% aromatic protons, more preferably less than 25% aromatic protons, more preferably less than 15% aromatic protons, more preferably less than 10% aromatic protons, more preferably less than 5% aromatic protons, more preferably less than 4% aromatic protons, more preferably less than 3% aromatic protons, more preferably less than 2% aromatic protons, more preferably less than 1% aromatic protons.

As used herein aromatic content and olefin content are measured by $^1$H-NMR as measured directly from the $^1$H NMR spectrum from a spectrometer with a field strength greater than 300 MHz, most preferably 400 MHz (frequency equivalent). Aromatic content is the integration of aromatic protons versus the total number of protons. Olefin proton or olefinic proton content is the integration of olefinic protons versus the total number of protons.

The resulting tackifier may have a number-average molecular weight (Mn) of 400-3000, a weight-average molecular weight (Mw) of 500-6000, a z-average molecular weight (Mz) of 700-15,000 and a polydispersity (PD) as measured by Mw/Mn between 1 and 45. As used herein, molecular weights (number average molecular weight (Mn), weight average molecular weight (Mw), and z-average molecular weight (Mz)) are measured by Size Exclusion Chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

PAOs

The PAO may comprise oligomers of linear olefins having 5 to 14 carbon atoms, more preferably 6 to 12 carbon atoms, more preferably 8 to 10 carbon atoms. Preferred PAOs have the properties described herein. Preferred PAOs are hydrogenated to yield substantially (>99 wt %) paraffinic materials.

When a combination of more than one PAOs is employed, it is preferred that the combination of PAOs have a pour point less than or equal to −38° C. and/or a Kinematic viscosity less than or equal to 10.5 mm$^2$/S at 100° C. Such formulations may include a PAO having one or more of the properties described herein and another PAO with properties that may or may not have one or more of the properties described herein as long as the combination of PAOs have a pour point less than or equal to −38° C. and/or a Kinematic viscosity less than or equal to 10.5 mm$^2$/s at 100° C.

The PAO(s) preferably have a viscosity index ("VI"), as determined by ASTM D-2270 of 100 or more, preferably 110 or more, and more preferably 120 or more. Preferred ranges for VI include from 100-180, more preferably 100-170, more preferably 100-160, more preferably 100-150, more preferably 110-150, more preferably 110-140, and more preferably 120-140.

Preferably, the PAO has a pour point≦about −38° C. (as determined by ASTM D 97), more preferably≦about −39° C., more preferably≦about −40° C., more preferably≦about −41° C., more preferably≦about −42° C., more preferably ≦about −43° C., more preferably≦about −44° C., more preferably≦about −45° C., more preferably≦about −50° C., more preferably≦about −55° C., more preferably≦about −60° C. Preferred ranges for the pour point include from about −38° C. to −75° C., more preferably from about −38° to −70° C., more preferably from about −40° C. to −75° C., more preferably from about −40° C. to −70° C., more preferably from about −40° C. to −65° C., more preferably from about −42° C. to −65° C., more preferably from about −45° C. to −65° C.

The PAO may comprise $C_{20}$ to $C_{1500}$ paraffins, preferably $C_{40}$ to $C_{1000}$ paraffins, preferably $C_{50}$ to $C_{750}$ paraffins, preferably $C_{50}$ to $C_{500}$ paraffins. The PAOs are preferably oligomers (are dimers, trimers, tetramers, pentamers, etc.) of $C_5$ to $C_{14}$ α-olefins, $C_6$ to $C_{12}$ α-olefins and/or $C_8$ to $C_{12}$ α-olefins. Suitable olefins include 1-pentene, 1-hexene, 1-heptene, 1-octene, 1-nonene, 1-decene, 1-undecene and 1-dodecene. In one embodiment, the olefin is 1-decene, and the PAO is a mixture of dimers, trimers, tetramers and pentamers (and higher) of 1-decene. Preferred PAO's are described more particularly in, for example, U.S. Pat. Nos. 5,171,908, and 5,783,531 and in SYNTHETIC LUBRICANTS AND HIGH PERFORMANCE FUNCTIONAL FLUIDS 1-52 (Leslie R. Rudnick & Ronald L. Shubkin, ed. Marcel Dekker, Inc. 1999). For example, the methods disclosed by U.S. Pat. Nos. 4,149,178 or 3,382,291 may be conveniently used to produce PAOs. Other descriptions of PAO synthesis are found in the following U.S. Pat. Nos. 3,742,082, 3,769,363, 3,876,720, 4,239,930, 4,367,352, 4,413,156, 4,434,408, 4,910,355, 4,956,122, and 5,068,487. Preferred PAOs are hydrogenated.

PAOs useful in the present invention typically possess a number average molecular weight (Mn) of from 100-21,000, more preferably 200-10,000, more preferably 200-7,000, more preferably 200-2,000, and more preferably from 200-500.

Preferred PAOs have Kinematic viscosities (mm$^2$/s (cSt)) (as measured by ASTM 445 at 100° C.)≦about 10.5, more preferably≦about 10.4, more preferably≦about 10.3, more preferably≦about 10.25, more preferably ≦about 10.2, more preferably≦about 10.1, more preferably 10.0. Suitable ranges of Kinematic viscosity @ 100° C. include about 0.1-10.5, more preferably about 0.5-10.5, more preferably about 0.5-10.4, more preferably about 1.0-10.25, more preferably about 1.5-10.0 and more preferably about 2.0 to 10.0. Other preferred ranges may include about 0.1-10, more preferably about 1.8-10, more preferably about 1.8-8, more preferably about 2-6, more preferably about 3-6 and more preferably about 4-6. Other suitable ranges include about 2, about 2.25, about 2.5, about 3, or about 4 as a lower limit and include any upper limit of about 10, about 9.5, about 9.25, about 9, about 8, about 7.5, about 7, or about 6.5.

Preferred PAOs have Kinematic viscosities (mm$^2$/s (cSt)) (as measured by ASTM 445 at 40° C.)≦about 120, more preferably≦about 110, more preferably≦about 100, more preferably≦about 80, more preferably≦about 75, more preferably≦about 70. Suitable ranges of Kinematic viscosity @ 40° C. include about 5-120, more preferably about 5-100, more preferably about 5-75, more preferably about 5-65, more preferably about 5-60, more preferably about 5-50, more preferably about 10-50, and more preferably about 15-50.

Preferred PAOs have a flash point measured the open cup method (ASTM- D92) of≧about 140° C., more preferably≧about 150° C., more preferably≧about 160° C., more preferably≧about 175° C., more preferably≧about 200° C., with suitable ranges of flash point falling from about 140°-300° C., more preferably about 160°-300° C., more preferably about 175° C.-300° C., more preferably about 200° C.-275° C., more preferably about 210°-275° C., and more preferably about 210° C.-250° C.

Useful PAO's include those sold under the tradenames SYNFLUID™ available from ChevronPhillips Chemical Co. in Pasadena, Tex., DURASYN™ available from BP Amoco Chemicals in London England, NEXBASE™ available from Fortum Oil and Gas in Finland, SYNTON™ available from Crompton Corporation in Middlebury, Conn., USA, EMERY™ available from Cognis Corporation in Ohio, USA. Exemplary preferred polyalphaolefin oils include DURASYN™ 162, 164, 166 and 168 available from BP Chemicals, SYNFLUID™ 2, 2.5, 4, 5, 6, 7 and 8 available from ChevronPhillips Chemical Company, EMERY™ 3004, 3006, and 3008 available from Cognis, and NEXBASE™ 2002, 2004, 2004FG, 2006, 2006FG, 2008 and 2008FG available from Fortum Oil and Gas of Finland, SYNTON™ 40 and 100 available from Crompton Corporation in Connecticut, USA. Suitable PAOs available from ExxonMobil Chemical Company in Houston, Tex., USA include:

| Grade | Specific Gravity @ 15.6° C. | Kinematic viscosity @ 100° C. | Kinematic viscosity @ 40° C. | Pour Point (° C.) | Flash Point (° C.) | Color ASTM |
|---|---|---|---|---|---|---|
| SPECTRASYN 2 | 0.798 | 1.68 | 5.30 | −60 | 155 | <0.5 |
| SPECTRASYN 2B | 0.802 | 1.80 | 5.80 | −54 | 150 | <0.5 |
| SPECTRASYN 4 | 0.818 | 4.00 | 18.0 | −57 | 218 | <0.5 |
| SPECTRASYN 5 | 0.824 | 5.10 | 25.0 | −57 | 240 | <0.5 |
| SPECTRASYN 6 | 0.826 | 5.80 | 30.0 | −57 | 240 | <0.5 |
| SPECTRASYN 8 | 0.833 | 7.90 | 47.0 | −54 | 250 | <0.5 |
| SPECTRASYN 10 | 0.835 | 10.0 | 68.0 | −54 | 265 | <0.5 |

Other exemplary PAOs include mixtures of any two or more of the above or mixtures of any one or more of the above with one or more any other PAO.

As illustrated below in the Examples, the softening point of the tackifier/PAO (relative to the softening point of the tackifier) is generally lower, depending on the concentration of PAO. This allows combining of PAOs and tackifiers to target the softening point of the tackifier for particular end uses on an as needed basis. The softening point of the tackifier PAO combinations is preferably below about 120° C., more preferably below about 110° C., more preferably below about 100° C., more preferably below about 90° C., and more preferably below about 80° C. Suitable ranges for softening point of the tackifier/PAO combination include about 25-80° C., more preferably about 30-70° C., more preferably about 35-65° C., more preferably about 40-60° C., and more preferably about 50-60° C.

Blending Into Adhesive Components and Compositions

Any of the previously described embodiments may be combined with other adhesive components and formulated into adhesives, hot melt adhesives (HMAs), pressure sensitive adhesives (PSAs), and/or hot melt pressure sensitive adhesive (HMPSAs). Adhesive applications include, but are not limited to, woodworking, packaging, bookbinding, tapes, labels, non-wovens or disposables. The embodiments described herein can also be formulated into compositions for sealants, rubber compounds, pipe wrapping, carpet backing, contact adhesives, road-marking, tires and/or inks. These compositions may be used without further dilution as in the case of HMAs or HMPSAs they may be diluted in appropriate solvents to form solvent-based adhesives (SBAs) or dispersed in water to form resin emulsions for water-based adhesives (WBAs). In general, any of the adhesive compositions described herein comprise (based on the total weight of the adhesive formulation) 0.5-80 wt % tackifier-PAO combinations as described herein, up to 80 wt % base polymer, with the remainder comprising other additives such as a filler or wax or other materials as described below. Other preferred ranges for the tackifier-PAO combination in the adhesive includes about 1-75 wt %, about 5-70 wt %, about 10-70 wt %, about 15-70 wt %, and about 15-65 wt %.

Any of the previously described embodiments may be combined or combined with a polyolefin (base polymer) to form an adhesive. Typical base polymers include polyethylene, ethylene copolymerized with one or more $C_3$ to $C_{20}$ linear, branched, or cyclic α-olefins, polypropylene, propylene copolymerized with one or more of ethylene and/or $C_4$ to $C_{20}$ linear, branched, or cyclic α-olefins, polybutylene, polybutylene copolymerized with one or more of $C_5$ to $C_{20}$ linear, branched, or cyclic α-olefins, low density polyethylene (LDPE) (density 0.915 to less than 0.935 g/cm³) linear low density polyethylene (LLDPE), ultra low density polyethylene (density 0.86 to less than 0.90 g/cm³), very low density polyethylene (density 0.90 to less than 0.915 g/cm³), medium density polyethylene (density 0.935 to less than 0.945 g/cm³), high density polyethylene (HDPE) (density 0.945 to 0.98 g/cm³). Other hydrocarbon polymers (or copolymers of) include: polybutene-1, polyisobutylene, polybutene, polyisoprene, polybutadiene, butyl rubber, amorphous polypropylene, ethylene propylene diene monomer rubber, natural rubber, styrene butadiene rubber, copolymers and halogenated copolymers of isobutylene and para-alkylstyrene, elastomers such as ethylene-propylene rubber (EPR), vulcanized EPR, EPDM, nylons, polycarbonates, PET resins, polymers of aromatic monomers such as polystyrene, copolymers of isobutylene and para-alkyl styrene, high molecular weight HDPE, low molecular weight HDPE, graft copolymers generally, polyacrylonitrile homopolymer or copolymers, thermoplastic polyamides, polyacetal, polyvinylidine fluoride and other fluorinated elastomers, polyethylene glycols, polyisobutylene, or blends thereof. Preferred α-olefins include propylene, butene, pentene, hexene, heptene, octene, nonene, dodecene, cyclopentene, 3,5,5-trimethylhexene-1,3-methylpentene-1,4-methyl pentene-1 and terpolymers of the above monomers. In another embodiment, the copolymer comprises a terpolymer of (i) ethylene and/or (ii) a $C_3$ to $C_{20}$ comonomer, and (iii) a diene. Preferred dienes include butadiene, pentadiene, hexadiene, norbornene, ethylidene norbornene, vinyl norbornene, dicyclopentadiene, and substituted versions thereof. The architecture of such polymers may be linear, substantially linear, short-chain branched, long-chain branched, star branched or any other combination thereof. The branches or arms may be the same as the main backbone or different such as branch-block polymers or multi-armed stars.

Suitable polymers also include polyisoprene, block copolymers of styrene and one or more conjugated dienes such as SI (Styrene-Isoprene), SBS (Styrene-Butadiene-Styrene), SB (Styrene-Butadiene), SIS (Styrene-Isoprene-Styrene), SEP (Styrene-Ethylene/Propylene), SEB (Styrene-Ethylene/Butylene), SEBS (Styrene-Ethylene/Butylene-Styrene), SEPS (Styrene-Ethylene/Propylene-Styrene), where the architecture of the block copolymers includes linear, radial or multi-arm star, multi-branched and may include various combinations of styrene (S), isoprene (I), or butadiene (B), which may or may not be hydrogenated, and mixtures of two or more thereof. The styrene block copolymers may comprise tetrablock or pentablock copolymers selected from SISI, SISB, SBSB, SBSI, SIBS, ISISI, ISISB, BSISB, ISBSI, BSBSB, BSBSI, SIBSB, BSIBS, SIBSI, ISIBS, SIBSB, ISIBS. The block copolymers may be used on their own or mixed with other polymers or styrene block copolymers.

Any of the previously described embodiments may be combined with or formulated into adhesives comprising polar polymers. As used herein, polar polymers include homopolymers, copolymers, and terpolymers containing polar groups such as esters, ethers, ketones, amides, imides, alcohols, phenols, halides, acids, anhydrides, sulfides, nitriles, isocyanates, aromatic and heteroaromatic groups. These polar substituents may be found in the polymer backbone, pendant to the polymer backbone or attached to an aromatic group that may be either incorporated in the polymer backbone or pendant to the polymer backbone. Suitable examples include copolymers of a $C_2$ to $C_{20}$ olefin, such as ethylene and/or propylene and/or butene with one or more polar monomers such as vinyl esters or alcohols, acids, anhydrides, acrylic or methacrylic acids or esters. Polar polymers also include any thermoplastic copolymer comprising a functional group capable of interacting with the unsaturated acid or anhydride group present with the resin material. Examples include, but are not limited to, polymers (or copolymers of) such as polyesters, polyamides, polyureas, polycarbonates, polyacrylonitriles, polyacrylates, polymethylacrylates, ethylene vinyl esters, halogenated polymers, polyvinyl chloride, polyethylene terephthalate, polybutylene terephthalate (PBT), polyacetal, acrylic or methacrylic acids, alkyl acrylates, or methacrylates, ethylene methyl acrylate, ethylene butyl acrylate, and the like. Accordingly, in one embodiment, the tackifier-PAO combination(s) may be formulated with a polar polymer, such as EVA. It may optionally comprise other components such as one or more waxes or oils.

Any of the previously described embodiments may be blended with grafted polymers or blends of grafted polymers and/or non-grafted polymers. Examples of polymers and of such blends include, but are not limited to, those described in U.S. Pat. No. 5,936,058.

Any of the previously described embodiments may be blended with elastomers to form adhesive sealants. Preferred elastomers include natural rubber, polyisoprene, polybutadiene, copolymers of butadiene with styrene, copolymers of butadiene with acrylonitrile, butyl rubber, polychloroprene, ethylene/propylene rubber and elastomeric copolymers of ethylene, propylene and a non-conjugated diene, styrenic block copolymers such as block copolymers of styrene and or α-methyl styrene with an alkadiene (such as isoprene or butadiene) in linear, radial, and/or tapered form.

In one embodiment, the base polymer may be a polymer produced using a metallocene catalyst system. Typically, the metallocene homopolymers or copolymers are produced using mono- or bis-cyclopentadienyl transition metal catalysts in combination with an activator of alumoxane and/or a non-coordinating anion in solution, slurry, high-pressure or gas phase. The catalyst system may be supported or unsupported and the cyclopentadienyl rings may be substituted or unsubstituted. Titanium, zirconium and hafnium are preferred transition metals. Several commercial products produced with such catalyst/activator combinations are commercially available from ExxonMobil Chemical Company in Baytown, Tex. under the tradenames EXCEED® and EXACT® or from Dow Chemical Company under the tradenames ENGAGE™ and AFFINITY™.

The metallocene produced copolymers described above preferably have a polydispersity less than 4 and a composition distribution breadth index (CDBI) of 50% or more, preferably above 60%, even more preferably above 70%. In one embodiment, the CDBI is above 80%, even more preferably above 90%, even more preferably above 95%. In one embodiment, the polyethylene copolymer has a CDBI between 60-85%, even more preferably between 65-85%. Composition Distribution Breadth Index (CDBI) is a measure of the composition distribution of monomer within the polymer chains and is measured by the procedure described in PCT publication WO 93/03093, published Feb. 18, 1993 including that fractions having a weight average molecular weight (Mw) below 15000 are ignored when determining CDBI.

Any of the previously described embodiments may be admixed with additives well known in the art in adhesive applications. In some embodiments, suitable adhesive applications may include additives in an amount of ≦about 30 wt %, more preferably ≦about 25 wt %, more preferably ≦about 20 wt %, more preferably ≦about 15 wt %, more preferably ≦about 10 wt %, and more preferably ≦about 5 wt %.

In adhesive applications where additional processing oils (such as naphtenic, paraffinic, aromatic oils, mineral oils, white oils, hydrogenated mineral oils and the like) are present, it is preferred that such materials is present in amounts (based on the weight of the adhesive formulation) ≦about 30 wt %, more preferably ≦about 17 wt %, more preferably ≦about 15 wt %, more preferably ≦about 12 wt %, more preferably ≦about 10 wt %, more preferably ≦about 7 wt %, more preferably ≦about 5 wt %, and more preferably ≦about 2 wt %. In adhesives applications, suitable oils include FLEXON® or PRIMOL® grades available from ExxonMobil Company, KAYDOL oil available from Crompton-Witco, NYFLEX grades available from Nynas of Sweden, EDELEX, GRAVEX and SHELLFLEX grades available from Shell Chemicals of Houston, Tex., and SUNPAR oils available from SUNOCO, Inc. of Philadelphia, Pa.

Exemplary additives include, but are not limited to performance oils, plasticizers, defoamers, rheology modifiers, humectants, surfactants, flame retardants, fluorescing agents, compatibalizers, anti-microbial agents, anti-block, antistatic, antioxidants, cross-linking agents, silica, carbon black, talc, pigments, fillers, processing aids, UV stabilizers, neutralizers, lubricants, anti-slip agents, slip agents, surfactants and/or nucleating agents. Examples of common additives include: antioxidants such as Irganox® 1010, silicon dioxide, titanium dioxide, polydimethylsiloxane, talc, dyes, wax, calcium stearate, carbon black and glass beads. In adhesive applications, suitable synthetic waxes include paraffin waxes, microcrystalline waxes having melting points within a range from about 55° C. to about 130° C. and low molecular weight polyethylene and Fischer-Tropsch waxes, maleinized waxes. The wax content is preferably from about 1 to about 35 wt.% of the total blend composition.

Optional components in an HMA embodiment are plasticizers or other additives such as oils, tackifiers, surfactants, fillers, color masterbatches, and the like. Preferred plasticizers include mineral oils, polybutenes, phthalates, and the like. Particularly preferred plasticizers include phthalates such as diisodecyl phthalate (DIOP), diisononylphthalate (DINP), dioctylphthalates (DOP). Particularly preferred oils include aliphatic naphthenic oils.

Another optional component of an HMA composition is a low molecular weight product such as wax, oil, or low number-average molecular weight (Mn) polymer, (low meaning below number-average molecular weight (Mn) of 5000, preferably below 4000, more preferably below 3000, even more preferably below 2500). Preferred oils include aliphatic naphthenic oils, white oils, or the like. Preferred low number-average molecular weight (Mn) polymers include polymers of lower α olefins such as propylene, butene, pentene, and hexene. A particularly preferred polymer includes polybutene having a number-average molecular weight (Mn) of less than 1000. An example of such a polymer is available under the trade name PARAPOL® 950 from ExxonMobil Chemical Company. PARAPOL® 950 is a liquid polybutene polymer having a number-average molecular weight (Mn) of 950 and a kinematic viscosity of 220 mm$^2$/s (cSt) at 100° C., as measured by ASTM D 445. Suitable embodiments of HMAs generally comprise 20-70 wt % tackifier-PAO combinations as described herein, 30-80 wt % base polymer, and 0-35 wt % wax.

HMAs embodiments can be used for disposable diaper and napkin chassis construction, elastic attachment in disposable goods, converting, packaging, labeling, bookbinding, woodworking, and other assembly applications. Particular examples include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkins adhesive strip, industrial filtration bonding, industrial filter material lamination, filter mask lamination, surgical gown lamination, surgical drape lamination, and perishable products packaging. Suitable embodiments of woodworking applications comprise 30-50 wt % base polymers, preferably an EVA, 15-35 wt % tackifier-PAO combinations as described herein, 20-50 wt % fillers, such as calcium carbonate, barium sulfate, silica or titanium dioxide. Suitable embodiments of bookbinding applications include 35-45 wt % base polymer, preferably an EVA, 35-45 wt % tackifier-PAO combinations as described herein, and 10-25 wt % wax.

Pressure Sensitive Adhesives

Suitable pressure sensitive adhesives can be formulated using tackifier-PAO combinations described herein. Any of the previously described embodiments may be formulated into pressure sensitive adhesives that may be applied to any conventional backing layer such as paper, recycled paper, kraft paper, vellum paper, calendered paper, clayed paper, foil, polymeric film, release liners, woven or non-woven backing material to make for example, packaging tapes, masking tapes and labels.

An embodiment of a hot melt pressure sensitive adhesive is a pressure sensitive adhesive for tapes applications comprising 100 parts by weight of a base polymer, preferably a styrenic block copolymer, from 50 to 180 phr (parts per 100 parts by weight base polymer) of tackifier-PAO combination as described herein, and optionally an extender oil, and 0-5 phr of anti-oxidant.

Another embodiment is a pressure sensitive adhesive for label applications. These adhesives generally comprise or consist essentially of (based on the weight of the adhesive) from 40 to 90 wt % of tackifier-PAO combination as described herein, from 10 to 60 wt % of polymer, preferably any of the block copolymers previously described herein and/or mixture thereof, and the remainder comprising additives well know in the art such as anti-block, anti-static, antioxidants, UV stabilizers, neutralisers, lubricants, surfactants, antinucleating agents and/or fillers. Preferred additives include silica, titanium dioxide, polydimethylsiloxane, talc, dyes, wax, calcium stearate, calcium carbonate, carbon black, barium sulphate and magnesium silicate. Other preferred ranges for the tackifier-PAO blend in a Pressure Sensitive Adhesive include from 50 to 80 wt %, from 50 to 75 wt %, from 55 to 75 wt %, from 50 to 70 wt %, from 60 to 80 wt %, and from 60 to 75 wt %, depending on the application. Other preferred ranges for the polymer include from 20 to 50 wt %, from 20 to 45 wt %, from 25 to 50 wt %, from 25 to 45 wt %, from 30 to 50 wt %, and from 30 to 45 wt %, depending on the application.

A suitable application for such PSAs, particularly, HMP-SAs is in the production of labels wherein the adhesive is applied to a release liner and subsequently laminated to a face stock. The laminate is then converted into a label stock. During label manufacture, a laminate of a face stock, pressure-sensitive adhesive layer, and a release liner, such as silicone-coated paper, which is passed through an apparatus that converts the laminate into commercially useful labels and label stock. The converting operation processes involve printing, die-cutting, and matrix stripping to leave labels on a release liner, marginal hole punching, perforating, fan folding, guillotining and the like. Such adhesives are suitable for applications requiring a typical die-cutting process, which involves cutting the laminate through to the release liner face. Other procedures involve cutting completely through the label laminate and include hole punching, perforating, and guillotining, particularly on flat sheets. Such PSAs and HMP-SAs are also suitable for applications including direct coating or liner less products.

The PSA formulations described herein exhibit excellent performance at low temperatures and ambient temperatures. Enhanced performance at elevated temperatures may be accomplished by cross-linking techniques such as the electron beam (EB) radiation and ultraviolet (UV) radiation and chemical cross-linking. If employed, tackifying additives should be substantially saturated so that all of the energy of cure goes into cross-linking of the adhesives elastomeric components.

Additives for Road Marking

The embodiments disclosed herein may be formulated into thermoplastic road-marking (TRM) compositions. Such formulation comprises a resin, plasticizer or an oil, pigment, fillers, glass beads, and/or adhesion promoters. The tackifier-PAO combinations described herein may be used as the primary resin of the road-marking composition or as an additional additive to the road-marking composition. The road-marking compositions containing tackifier-PAO combinations can additionally comprise EVA, polyisobutylene, block copolymers as described herein, polyethylene waxes, hydrocarbon resins, rosin esters, rosin derivatives, maleic acid/anhydride modified tackifier and hydrogenated version of such resins.

One embodiment of a TRM application comprises 2-40 wt % tackifier-PAO combinations as described herein, 2-20 wt % pigment, such as $TiO_2$, 1-10 wt % oil, 0-7 wt % base polymers, and the remainder comprising a filler such as glass beads, calcium carbonate, sand, silica or others described herein.

Process

The combinations of PAO(s) and tackifier(s) may be blended or combined by any suitable means. For example, they may be combined in a static mixer, batch mixer, extruder, or a combination thereof, that is sufficient to achieve an adequate dispersion of the PAO in the tackifier. The mixing step may involve first dry blending using, for example, a tumble blender. Dispersion may take place as part of a processing method used to fabricate articles, such as in the extruder on an injection molding machine or fiber line. The PAO may be injected into the extruder barrel or introduced at the feed throat of the extruder to save the step of pre-blending. In another embodiment, tackifier pellets could dry blended to achieve a homogeneous mixture at the desired concentrations. In yet another embodiment, tackifier pellets could be added to a pre-existing PAO-tackifier combination to blend down the PAO concentration.

In some embodiments, it is preferred that the operating temperature during the mixing/blending step be above the softening point of the tackifier but below the flash point of the PAO. It may also be preferred to admix the PAO slowly to prevent pooling of the PAO in the tackifier. In some embodiments, the combination may be cooled and allowed to "solidify" or it may be kept in molten form.

Alternatively, in making an adhesive composition, one could combine one or more of the adhesive components described herein with the tackifier and subsequently admix the PAOs. Or, one could combine one or more of the adhesive components described herein with the PAO and subsequently admix the tackifier. The selection of the method is at the discretion of the end user.

In yet another embodiment, a masterbatch approach could be employed, wherein the combination of PAO and tackifier is mixed and additionally admixed with one or more of additives and/or carrier polymers, which may include any of the polymeric materials described herein (and depending on the ultimate end use of the masterbatch). For example, in an adhesive application, the carrier polymer may comprise one of the previously described block copolymers, ethylene-vinyl acetate copolymers, or a $C_2$-, $C_3$-, or $C_4$-based homo-, co- or terpolymer. In a film application, the carrier polymer may include any previously described polymer, and may preferably comprise polyamide, PET, ethylene-vinyl acetate copolymer, or a $C_2$-, $C_3$-, or $C_4$-based homo-, co- or terpolymer.

EXAMPLES

TABLE 1

Materials used in the Examples

| Material | Description | Source |
|---|---|---|
| ESCOREZ ® 5690 | Hydrogenated aromatic cyclo-aliphatic hydrocarbon resin having a Ring and Ball softening point of 89° C. | ExxonMobil Chemical Company |
| ESCOREZ ® 5600 | Hydrogenated aromatic cyclo-aliphatic hydrocarbon resin having a Ring and Ball softening point of 103° C. | ExxonMobil Chemical Company |
| ESCOREZ ® 1310 | Aliphatic Hydrocarbon Resin having a Ring and Ball softening point of 93° C. | ExxonMobil Chemical Company |
| SYLVALITE ™ RE100S | Rosin Ester | Arizona Chemical Company |
| WINGTACK ™ 10 | Liquid aliphatic $C_5$ hydrocarbon resin having a softening point of 10° C. | Goodyear Chemical Company |
| VECTOR ® 4114 | (SIS/SI) linear block copolymer containing 42 wt % SI diblock | Dexco Polymers, LP |
| VECTOR ® DPX-565 | (SIS/SI) linear block copolymer containing 56 wt % SI diblock | Dexco Polymers, LP |
| VECTOR ® DPX-586 | Styrene-Isoprene $(SI)_n$/SIradial block copolymer | Dexco Polymers, LP |
| IRGANOX ™ 1076 | Phenolic antioxidant | Ciba-Geigy |

TABLE 2

PAOs used in the Examples

| PAO* | Specific gravity (15.6/15.6° C.) | Kinematic Viscosity @ 100° C. (mm²/s) | VI | Pour Point, (° C.) |
|---|---|---|---|---|
| SHF-41 | 0.818 | 4.00 | 123 | −57 |
| PURESYN ™ 6 | 0.827 | 5.7 | 134 | −54 |
| SHF-101 | 0.835 | 10.0 | 136 | −54 |
| SUPERSYN ™ 2300 | 0.852 | 300 | 235 | −30 |

*polyalphaolefin oligomeric oils available from ExxonMobil Chemical Company

Examples 1-22

The components listed in the tables were mixed together in the amounts listed in the tables using a Z-blade mixer or a coaxial stirrer, at a temperature between 155 and 185° C. The Mettler softening point of the resulting mixture was then measured.

TABLE 3

Examples 1-11

| Component (parts by weight) | 1 | 2 | 3 | 4 | 5 | 6 | 7 | 8 | 9 | 10 | 11 |
|---|---|---|---|---|---|---|---|---|---|---|---|
| ESCOREZ ® 5690 | 95 | 90 | 85 | 80 | 75 | 92 | 84 | 76 | 92 | 84 | 76 |
| PURESYN ™ 6 | 5 | 10 | 15 | 20 | 25 | | | | | | |
| SHF-101 | | | | | | 8 | 16 | 24 | | | |
| SUPERSYN ™ 2300 | | | | | | | | | 8 | 16 | 24 |
| Softening Point - Mettler (° C.) | 77 | 65 | 54 | 43 | 35 | 71 | 56 | 41 | 84 | 81 | 78 |

TABLE 4

Examples 12-22

| Component (parts by weight) | 12 | 13 | 14 | 15 | 16 | 17 | 18 | 19 | 20 | 21 | 22 |
|---|---|---|---|---|---|---|---|---|---|---|---|
| ESCOREZ ® 5690 | 92.2 | 87.5 | 82.7 | 76 | 91.5 | 75.5 | 95 | 90 | 85 | 80 | 75 |
| PURESYN ™ 6 | 7.8 | 12.5 | 17.3 | 24 | | | | | | | |
| SHF-101 | | | | | 8.5 | 24.5 | 5 | 10 | 15 | 20 | 25 |
| Softening Point - Mettler (° C.) | 70 | 59 | 49 | 42 | 71 | 38 | 75 | 62 | 50 | 39 | 33 |

From the data in Tables 3 and 4, a skilled person could conduct a linear regression of these data to determine the amount of PAO needed to reach a particular softening point. Based on the data and regression, the following hypothetical amounts of each PAO (based on the weight of the tackifier alone) combined with the tackifier of Examples 1-22 would be needed to reach a targeted softening point. Such an analysis could easily be conducted for any tackifier-PAO combination in an effort to efficiently tailor the softening point of the combination.

TABLE 5

Hypothetical Softening Points of an Escorez ® 5690 Hydrocarbon Resin based on PAO content

| Targeted Softening Point (° C.) | SHF-41 (wt % added) | Puresyn 6 (wt % added) | SHF 101 (wt % added) | Supersyn 2300 (wt % added) |
|---|---|---|---|---|
| 80 | 1.82 | 3.1 | 3.2 | 18.7 |
| 70 | 6.50 | 7.83 | 8.53 | 45.3 |
| 60 | 11.17 | 12.6 | 13.9 | 72.0 |
| 50 | 15.84 | 17.3 | 19.2 | 98.7 |
| 40 | 20.51 | 22.0 | 24.5 | 125.3 |
| 30 | 25.19 | 26.7 | 29.9 | 152 |

Examples 23-25

The components listed in Examples 14-15 and 17 were mixed as described above the resulting materials were tested for color measurement and heat stability. The color was evaluated with a Hunterlab spectrophotometer.

TABLE 6

Examples 23-25

| | Example | | |
|---|---|---|---|
| | 23 | 24 | 25 |
| Components (%) | | | |
| Escorez ® 5690 | 82.7 | 76 | 75.5 |
| Puresyn ™ 6 | 17.3 | 24 | |
| SHF-101 | | | 25 |

TABLE 6-continued

Examples 23-25

| | Example | | |
|---|---|---|---|
| | 23 | 24 | 25 |
| Softening Point (Mettler/° C.) | 49 | 42 | 38 |
| Brookfield Viscosity (mPa · s @ 175° C.) | 89 | 81 | 92 |
| Initial Color | | | |
| YI (ASTM-D1925) | 8.4 | 7.0 | 7.3 |
| Heat Stability (@ 175° C., 5 hrs) | | | |
| YI (ASTM-D1925) | 35.8 | 37.5 | 44.3 |
| Gardner (ASTM D-6166) | 4.1 | 4.2 | 4.8 |

Examples 26-29

In the examples 26-29, HMPSAs were prepared by mixing the block copolymers with the tackifier PAO combinations in a laboratory Z-blade mixer of 300 ml capacity, at a temperature of about 145° C. A small amount of phenolic antioxidant was added to the blend to prevent its degradation during the blending process. The total mixing time was about 70 minutes.

Final blend viscosity was evaluated with a Brookfield viscosimeter according to a procedure based on ASTM D 3236-88.

The pressure sensitive adhesives were applied as hot melt adhesives to a silicone coated paper at a coating weight of about 20 g/m$^2$, using an Acumeter laboratory coater with a slot die for extrusion of the molten adhesive at a temperature of 165° C. The lamination was done according to industry practice, by transfer coating from the silicone coated paper release substrate onto a 80 g/m$^2$ vellum paper frontal substrate.

The adhesive performances were evaluated according to test methods published by Finat, Postbus 85612, NL-2508-CH, The Hague, e.g., FTM 1 for the peel adhesion at 180°, FTM 8 for the shear resistance and FTM 9 for the loop tack measurements. In the examples, adhesive failure (af), cohesive failure (cf), paper tear (pt), and jerking (j) are indicated where necessary. The results are shown in Table 7.

TABLE 7

Examples 26-29

| | | Example | | | |
|---|---|---|---|---|---|
| Component (%) | Comparative example 1 | 26 | 27 | 28 | 29 |
| Tackifier/PAO Mixture of Example 17 | | 69 | | | |
| Tackifier/PAO Mixture of Example 19 | | | 69 | | |
| Tackifier/PAO Mixture of Example 21 | | | | 42.1 | |
| Tackifier/PAO Mixture of Example 22 | | | | | 31 |
| VECTOR ® DPX-586 | 31 | 31 | 31 | 31 | 31 |
| ESCOREZ ® 1310 | 42 | | | 26.9 | 38 |
| WINGTACK ® 10 | 27 | | | | |
| IRGANOX ® 1076 | 0.3 | 0.3 | 0.3 | 0.3 | 0.3 |
| Brookfield Viscosity (@175° C., mPa · s) | 5840 | 5860 | 5910 | 4130 | 5640 |
| 180° Peel strength (N/25 mm) @ 23° C./50% humidity - glass | 32.6 cf + pt | 32.3 pt | 33.1 Pt | 32.0 cf + pt | 32.8 pt |
| 180° Peel strength (N/25 mm) @ 23° C./50% humidity - PE | 28.9 cf + pt | 22.0 af + pt | 23.4 af + pt | 24.0 af | 25.3 af + pt |
| Loop Tack (N) @ 23° C./50% humidity - glass | 27.7 af | 18.0 pt | 19.1 Af | 21.1 af | 29.2 pt |

TABLE 7-continued

Examples 26-29

| Component (%) | Comparative example 1 | 26 | 27 | 28 | 29 |
|---|---|---|---|---|---|
| Loop Tack (N) @ 23° C./50% humidity - PE | 19.1 af | 17.6 pt | 18.7 Af | 14.6 af | 18.5 pt |
| Shear (hrs) at room temperature | 120 | >150 | >150 | 78.0 cf | >150 |

Examples 30-32

The components listed in Table 8 were mixed together in the amounts listed using the same process as for Examples 1-22. The resulting softening point of the combinations was measured.

TABLE 8

Examples 30-32

| Component (%) | 30 | 31 | 32 |
|---|---|---|---|
| ESCOREZ ® 5600 | 90 | 80 | 75 |
| SHF-41 | 10 | 20 | 25 |
| Softening Point - Mettler (° C.) | 75 | 54 | 37 |

The components of examples 30-32 were used in a hot-melt formulation in the amounts indicated in Table 9 and made according to the procedure previously described in Examples 26-29. Comparative Examples 1 and 2 were prepared by the same methods. The results are illustrated in Table 9.

Example 36

In example 36, a HMPSA was prepared by mixing the block copolymers with the tackifiers and the PAO in a laboratory z-blade mixer of 300 ml capacity. The adhesive was made and tested according to the procedures described previously for Examples 26-29. The results are illustrated in Table 9.

TABLE 9

Examples 33-36

| Component (%) | Comp. Ex. 1 | Comp. Ex. 2 | 33 | 34 | 35 | 36 |
|---|---|---|---|---|---|---|
| Tackifier/PAO Mixture of Example 32 | | | 57 | | | |
| Tackifier/PAO Mixture of Example 33 | | | | 42 | 42 | |
| VECTOR ® DPX-586 | 31 | | 31 | 31 | | |
| VECTOR ® DPX-565 | | 31 | | | 31 | |
| VECTOR ® 4114 | | | | | | 35 |
| ESCOREZ ® 1310 | 42 | 42 | 12 | 27 | 27 | |
| WINGTACK ® 10 | 27 | 27 | | | | 20 |
| SHF-41 | | | | | | 13 |
| SYLVALITE ™ RE100S | | | | | | 32 |
| IRGANOX ® 1076 | 0.3 | 0.3 | 0.3 | 0.3 | 0.3 | 0.3 |
| Brookfield Viscosity (@175° C., mPa · s) | 5840 | 12900 | 4005 | 3710 | 5910 | 8540 |
| 180° Peel strength (N/25 mm) @ 23° C./50% humidity - glass | 32.6 cf + pt | 36 cf + pt | 34.4 cf + pt | 34.9 cf + pt | 34.6 cf + pt | 19.7 af |
| 180° Peel strength (N/25 mm) @ 3° C. - glass | | 24.3 pt | 34.6 pt | 36.7 pt | 34.8 pt | 25.8 af + pt |
| 180° Peel strength (N/25 mm) @ 23° C./50% humidity - PE | 28.9 cf + pt | 24.6 af | 24.8 af | 27.5 af | 24.2 af | 5.5 af |
| 180° Peel strength (N/25 mm) @ 3° C. - PE | | 23 pt | 24.8 af + pt | 27.5 af + pt | 26.6 af + pt | 22.8 af |
| Loop Tack (N) @ room temperature - glass | 27.7 af | 26.9 af | 27.0 af | 25.4 af | 21.3 af | 11.7 af |
| Loop Tack (N) @ 3° C. - glass | | 12 pt | 13.6 pt | 11.7 pt | 10.4 pt | 14.2 af + pt |
| Loop Tack (N) @ 23° C./50% humidity - PE | 19.1 cf | 20.7 af | 18.4 af | 18.6 af | 15.8 af | 9.1 af |
| Loop Tack (N) @ 3° C. - PE | | 7 af | 11.0 af + j + pt | 11.8 af + j + pt | 17.9 af + j + pt | 16.2 af + pt |
| Shear (hrs) at room temperature | 120 | 152 | >200 cf | 123 cf | 65.5 cf | >150 |

Example 37

Linear alpha olefins (LAO) may also be strong depressants of tackifying resin softening points, with longer chain LAOs having a stronger effect. Such resins can be produced with severe stripping giving a medium softening point tackifier having high flash points and low volatility and therefore more acceptable in the hot melt industry. This route could be considered for production of LAO-spiked aliphatic resins, aromatic modified aliphatic resins, DCPD resins, as well as hydrogenated derivative versions of such grades. The LAO-spiked resin polymerization feed could be a cracked petroleum feed containing $C_4$, $C_5$ and $C_6$ paraffins, olefins and conjugated diolefins referred herein as $C_5$ monomers, leading to an aliphatic resin. The LAO-spiked resin polymerization feed may also comprise $C_8$-$C_{10}$ aromatic monomers leading to such aromatic modified aliphatic resins. The LAO-spiked resin polymerization feed could also comprise unsaturated monomers of DCPD and/or substituted DCPD. In one embodiment, the feed also comprises aromatic monomers. The polymerized resin material could also be hydrogenated to reduce coloration and to improve the color stability of the resin, leading to water white resins.

In the example 37, HMPSA was prepared by mixing the block copolymers with the LAO modified tackifier (e.g., ESCOREZ 5000 grade) and other tackifiers according to the procedure previously described in Examples 26-29. As used herein "linear alpha olefins" are oligomers of n-$C_5$ to n-$C_{50}$, preferably n-$C_5$ to n-$C_{30}$, preferably n-$C_5$ to n-$C_{20}$. Comparative Examples 1 was prepared by the same methods. The results are illustrated in Table 10.

TABLE 10

| | Examples 37 | |
| --- | --- | --- |
| | | Example |
| Component (%) | Comp. Ex. 1 | 37 |
| LAO spiked ESCOREZ 5000 grade | | 39.8 |
| VECTOR ® DPX-586 | 31 | 31 |
| ESCOREZ ® 1310 | 42 | 29.2 |
| WINGTACK ® 10 | 27 | |
| IRGANOX ® 1076 | 0.3 | 0.3 |

TABLE 10-continued

| | Examples 37 | |
| --- | --- | --- |
| | | Example |
| Component (%) | Comp. Ex. 1 | 37 |
| Brookfield Viscosity (@175° C., mPa·s) | 5840 | 3915 |
| 180° Peel strength (N/25 mm) @ 23° C./50% humidity - glass | 32.6 cf + pt | 35.4 cf + pt |
| 180° Peel strength (N/25 mm) @ 3° C. - glass | | 36.1 pt |
| 180° Peel strength (N/25 mm) @ 23° C./50% humidity - PE | 28.9 cf + pt | 26.9 af |
| 180° Peel strength (N/25 mm) @ 3° C. - PE | | 27.9 af + pt |
| Loop Tack (N) @ room temperature - glass | 27.7 af | 29 af |
| Loop Tack (N) @ 3° C. - glass | | 12.8 pt |
| Loop Tack (N) @ 23° C./50% humidity - PE | 19.1 cf | 20.8 af |
| Loop Tack (N) @ 3° C. - PE | | 6.9 af |
| Shear (hrs) at room temperature | 120 | 106 |

The invention claimed is:

1. A composition consisting of:
   (a) from 75-95 wt % of at least one hydrogenated tackifier comprising polycyclopentadiene resins; and
   (b) from 5-25 wt % PAO of at least one polyalphaolefin oil (PAO), based on the weight of the tackifier and PAO(s), wherein the collective at least one PAO has at least one property chosen from the group consisting of:
      (i) a Kinematic viscosity≦10.5 $mm^2$/s at 100° C.; and
      (ii) a pour point≦−38° C.

2. An adhesive comprising a composition consisting of:
   (a) from 75-95 wt % of at least one hydrogenated tackifier comprising polycyclopentadiene resins; and
   (b) from 5-25 wt % PAO of at least one polyalphaolefin oil (PAO), based on the weight of the tackifier and PAO(s), wherein the collective at least one PAO has at least one property chosen from the group consisting of:
      (i) a Kinematic viscosity≦10.5 $mm^2$/s at 100° C.; and
      (ii) a pour point≦−38° C.

* * * * *